United States Patent
Baheti et al.

(10) Patent No.: US 11,791,538 B1
(45) Date of Patent: Oct. 17, 2023

(54) ANTENNA IN PACKAGE ARRANGEMENT

(71) Applicant: Infineon Technologies AG, Neubiberg (DE)

(72) Inventors: Ashutosh Baheti, Munich (DE); Saverio Trotta, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/704,974

(22) Filed: Mar. 25, 2022

(51) Int. Cl.
  *H01Q 1/24* (2006.01)
  *H01Q 1/22* (2006.01)
  *G01S 13/88* (2006.01)

(52) U.S. Cl.
  CPC .......... *H01Q 1/2283* (2013.01); *G01S 13/88* (2013.01); *H01Q 1/243* (2013.01)

(58) Field of Classification Search
  CPC ....... H01Q 1/243; H01Q 1/2283; G01S 13/88
  See application file for complete search history.

(56) References Cited

U.S. PATENT DOCUMENTS

| | | |
|---|---|---|
| 10,164,324 B1 | 12/2018 | He et al. |
| 10,186,752 B2 | 1/2019 | Chen et al. |
| 10,297,927 B2 | 5/2019 | Amadjikpe |
| 10,333,221 B2 | 6/2019 | Yu et al. |
| 10,347,598 B2 | 7/2019 | Baek et al. |
| 10,431,892 B2 | 10/2019 | Garcia et al. |
| 2012/0229346 A1 | 9/2012 | Chen et al. |
| 2016/0306034 A1 | 10/2016 | Trotta et al. |
| 2018/0026377 A1 | 1/2018 | Trotta et al. |
| 2018/0309186 A1 | 10/2018 | Yu et al. |
| 2018/0309198 A1 | 10/2018 | Yu et al. |
| 2018/0375193 A1 | 12/2018 | Zhang et al. |
| 2019/0013584 A1 | 1/2019 | Ryu et al. |
| 2019/0020114 A1 | 1/2019 | Paulotto et al. |
| 2019/0097317 A1 | 3/2019 | Di Nallo et al. |
| 2019/0103653 A1 | 4/2019 | Jeong et al. |
| 2019/0123425 A1 | 4/2019 | Jeong et al. |
| 2019/0207310 A1 | 7/2019 | Gu |

(Continued)

FOREIGN PATENT DOCUMENTS

| | | |
|---|---|---|
| EP | 3280126 A1 | 2/2018 |
| EP | 3916909 A1 | 12/2021 |

OTHER PUBLICATIONS

Chatterjee, S. et al., "Design of Compact Microstrip Antenna for S-Band Microwave Communication," Special Issue of International Journal of Computer Applications (0975 8887), International Conference on Computing, Communication and Sensor Network (CCSN), Mar. 2013, 5 pages.

(Continued)

*Primary Examiner* — Graham P Smith
(74) *Attorney, Agent, or Firm* — Slater Matsil, LLP

(57) ABSTRACT

In an embodiment, a device includes: a first support structure having a main surface and an edge surface; a screen covering the first support structure and having a main surface and an edge surface; a glass covering the screen; a frame; and a package electrically coupled to the first support structure via a connector, the package including a radio-frequency integrated circuit (RFIC) and a laminate that has a plurality of interconnect levels including an end-fire antenna configured to direct a first millimeter-wave radiation beam through the glass, and a patch antenna configured to direct a second millimeter-wave radiation beam through the frame, where the screen partially covers the laminate.

22 Claims, 15 Drawing Sheets cross-section view

(56) References Cited

U.S. PATENT DOCUMENTS

2019/0252771 A1  8/2019  Yong et al.
2019/0260127 A1  8/2019  Shi et al.

OTHER PUBLICATIONS

Chauhan B. et al., "Millimeter-Wave Mobile Communications Microstrip Antenna for 5G—A Future Antenna," International Journal of Computer Applications (0975 8887), vol. 99, No. 19, Aug. 2014, 4 pages.

Corning® Gorilla Glass, "Corning® Gorilla® Glass 6—Corning's latest innovation is engineered to better survive multiple drops. In laboratory tests, on average, Gorilla Glass 6 survived 15 drops from 1 meter onto rough surfaces and is up to 2x better than Gorilla Glass 5. Under the same conditions competitive glass compositions broke on the first drop. Gorilla Glass 6 also has better drop performance at higher heights compared to Gorilla Glass 5," CorningGorillaGlass.com, Sep. 2018, 2 pages.

Corning® Gorilla Glass, "Corning® Gorilla® Glass 5—Corning's latest glass design was formulated to address breakage the greatest concern of consumer, according to Corning's research. The new glass is just as thin and light as previous versions, but has been formulated to deliver dramatically improved damage resistance allowing improved in-field performance. Corning® Gorilla® glass 5 has been tested for performance when subjected to sharp contact damage," CorningGorillaGlass.com, Apr. 2018, 2 pages.

front view cross-section view cross-section view top view

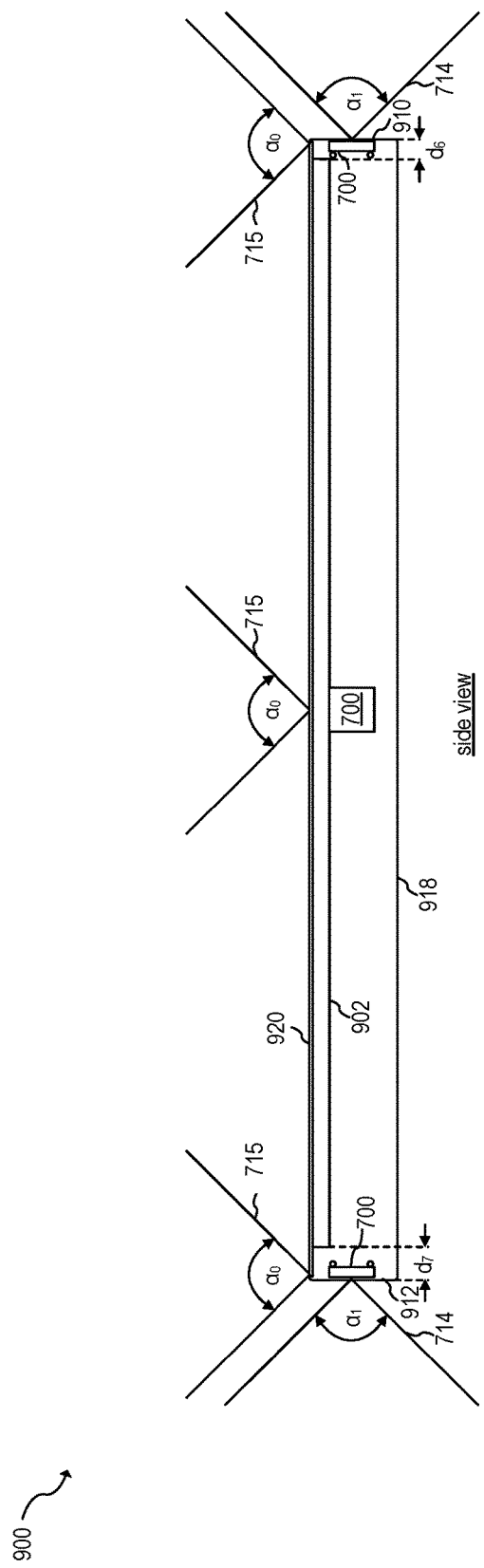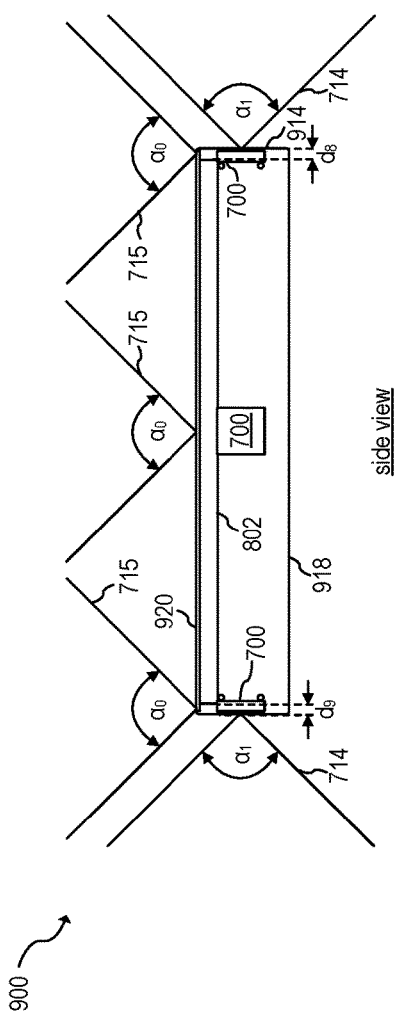
FIG. 9B
FIG. 9C cross-section view top view

ANTENNA IN PACKAGE ARRANGEMENT

TECHNICAL FIELD

The present disclosure relates generally to an electronic system and method, and, in particular embodiments, to an antenna in package arrangement.

BACKGROUND

Mobile devices, such as smartphone, tablets, laptops, and wearable devices, are now ubiquitous. Most modern mobile devices include communication capabilities (e.g., one or more of WiFi, Bluetooth, LTE, etc.), and a display (also referred to as a screen) with touchscreen capabilities. A glass generally covers the display to, e.g., protect it from impact (e.g., to protect the mobile device from damaging drops), without interfering with touchscreen and display operations.

Typical examples of glass used to cover the display of mobile devices include tempered glass, Dragontrail glass and Corning® Gorilla® glass, such as such as Gorilla® glass 4, Gorilla® glass 5, and Gorilla® glass 6. For example, all of Gorilla® glass 4, 5, and 6 include a core glass and a compression layer. Gorilla® glass 4, 5 and 6 have a refractive index (at 590 nm) between 1.49 and 1.51, are available in thicknesses between 0.4 mm and 1.3 mm, and exhibits a fracture toughness between 0.67 and 0.7 MPa m$^{0.5}$, and a shear modulus between 26 and 31.9 GPa. Other examples, such as glass that includes sapphire, are also used.

Mobile devices are getting thinner and their display size is getting larger. For example, bezel-less and edge-to-edge design have gained popularity in recent years. For example, FIG. 1 shows an example of smartphone 100 without bezel-less design. FIG. 2 shows an example of smartphone 200 with bezel-less design. For clarity purposes, not all features of smartphones 100 and 200 are shown.

As shown in FIG. 1, bezel 104 is the region of the front surface of smartphone 100 that surrounds screen 102. Bezel 104 extends from the screen to the frame. For example, bezel 104 extends from screen 102 to top frame 110, bottom frame 112, right frame 114, left frame 116 Components such as speaker 106 and camera 107 are disposed in bezel 104. Glass 120, such as tempered glass, Dragontrail glass and Corning® Gorilla® glass covers front side 108 and extends frame-to-frame (i.e., from top frame 110 to bottom frame 112, and from right frame 114 to left frame 116).

As shown in FIG. 2, the term bezel-less design refers to a design with less bezel than a non-bezel-less design. For example, smartphone 200 has bezel 204 surrounding screen 202. A glass (not shown) such as tempered glass, Dragontrail glass and Corning® Gorilla® glass covers front side 208 and extends frame-to-frame (i.e., from top frame 210 to bottom frame 212, and from right frame 214 to left frame 216).

Bezel-less designs allows for a larger display size, which allows for displaying more content, and for improving the user experience.

SUMMARY

In accordance with an embodiment, a device includes: a first support structure having a main surface and an edge surface; a screen covering the first support structure and having a main surface and an edge surface; a glass covering the screen; a frame; and a package electrically coupled to the first support structure via a connector, the package including a radio-frequency integrated circuit (RFIC) and a laminate that has a plurality of interconnect levels, the plurality of interconnect levels including an end-fire antenna configured to direct a first millimeter-wave radiation beam through the glass, and a patch antenna configured to direct a second millimeter-wave radiation beam through the frame, where the screen partially covers the laminate.

In accordance with an embodiment, a mobile device includes: a screen; a glass; first, second, third and fourth frames that surround the screen and the glass; a gap between the screen and the first frame; a first printed circuit board (PCB) having a main surface facing the first frame and an edge surface facing the screen; and a package electrically coupled to the first PCB via a connector, the package including a radio-frequency integrated circuit (RFIC) that includes a millimeter-wave radar and a laminate having a plurality of interconnect levels, where a first interconnect level of the plurality of interconnect levels includes an end-fire antenna configured to direct a first millimeter-wave radiation beam through the gap and the glass, and where a second interconnect level of the plurality of interconnect levels includes a patch antenna configured to direct a second millimeter-wave radiation beam through the first frame, where the package has a first thickness, and where a distance between the screen and the first frame is lower than the first thickness.

In accordance with an embodiment, a method for transmitting and receiving radar signals in a mobile device includes: transmitting a first radar signal through a glass of the mobile device with a first Yagi antenna of a package, the first Yagi antenna being formed in a first interconnect level of a laminate of the package, where a screen of the mobile device covers the laminate and does not cover the first interconnect level; transmitting a second radar signal through a frame of the mobile device with a first patch antenna of the package, the first patch antenna being formed in a second interconnect level of the laminate, the first interconnect level being different from the second interconnect level; and receiving reflected radar signals with a second Yagi antenna formed in the first interconnect level and a second patch antenna formed in the second interconnect level.

BRIEF DESCRIPTION OF THE DRAWINGS

For a more complete understanding of the present invention, and the advantages thereof, reference is now made to the following descriptions taken in conjunction with the accompanying drawings, in which:

FIGS. 9A-9C show various views of a smartphone having a bezel-less design and including four millimeter-wave radars, according to an embodiment of the present invention;

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a mobile device having a bezel-less design and including a millimeter-wave radar. Embodiments of the present invention may also be used in devices having a bezel, in electronic devices that are not mobile, such as a television, and in devices that include radio-frequency (RF) circuits in addition to or instead of a millimeter-wave radar, such as 5G communication circuits.

In an embodiment of the present invention, a mobile device includes a package that includes a millimeter-wave radar, a Yagi antenna configured to radiate radar signals through a glass of the mobile device, and a patch antenna configured to radiate radar signals through a frame of the mobile device. The Yagi antenna and the patch antenna are formed in different interconnect levels of a high speed laminate of the package. The package is coupled via a plurality of balls to a main surface of a printed circuit board (PCB), where the main surface of the PCB is substantially perpendicular to a main surface of a screen of the mobile device.

Figure 1:
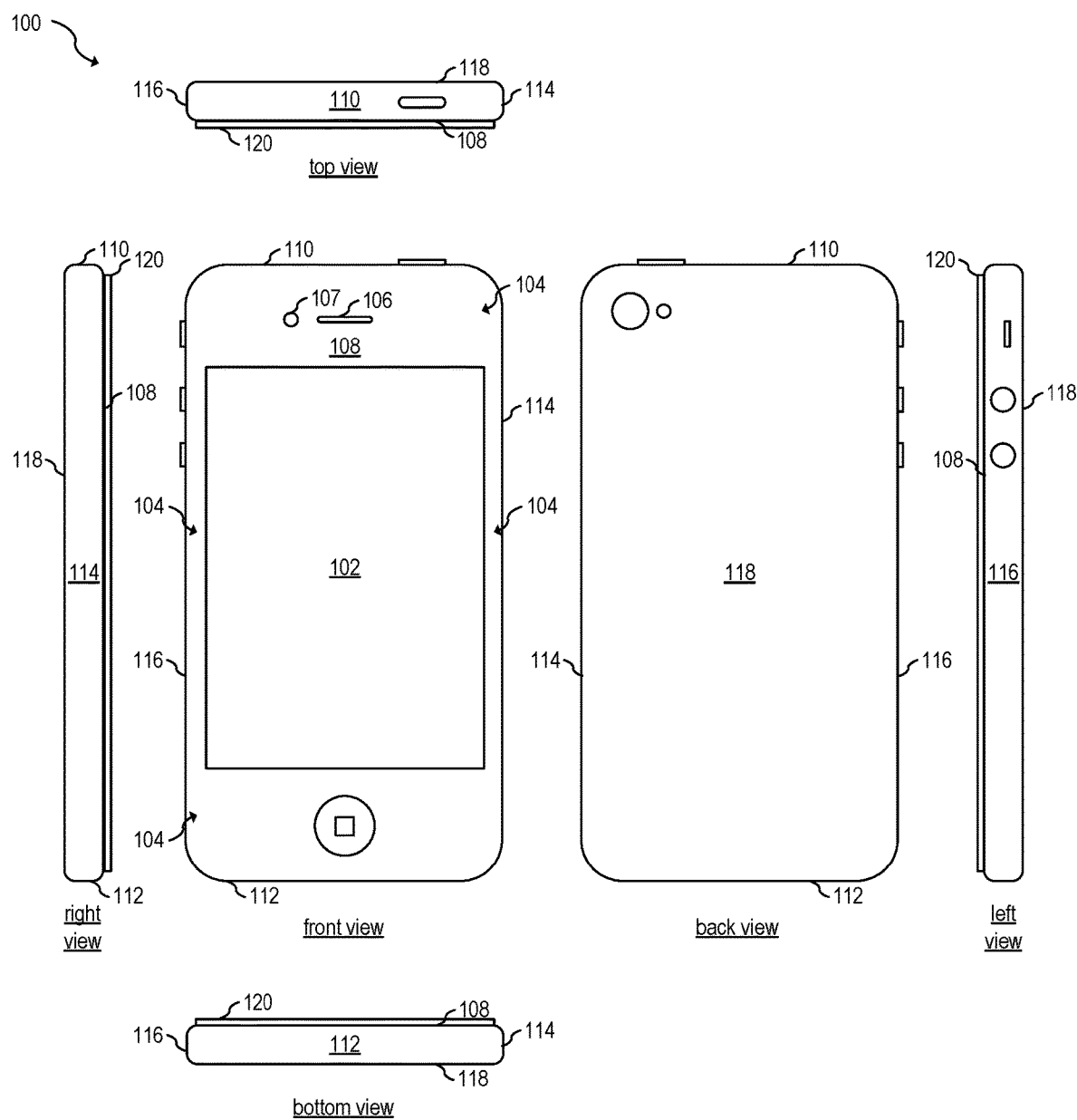
FIG. 1 shows an example of a smartphone without bezel-less design.
Figure 2:
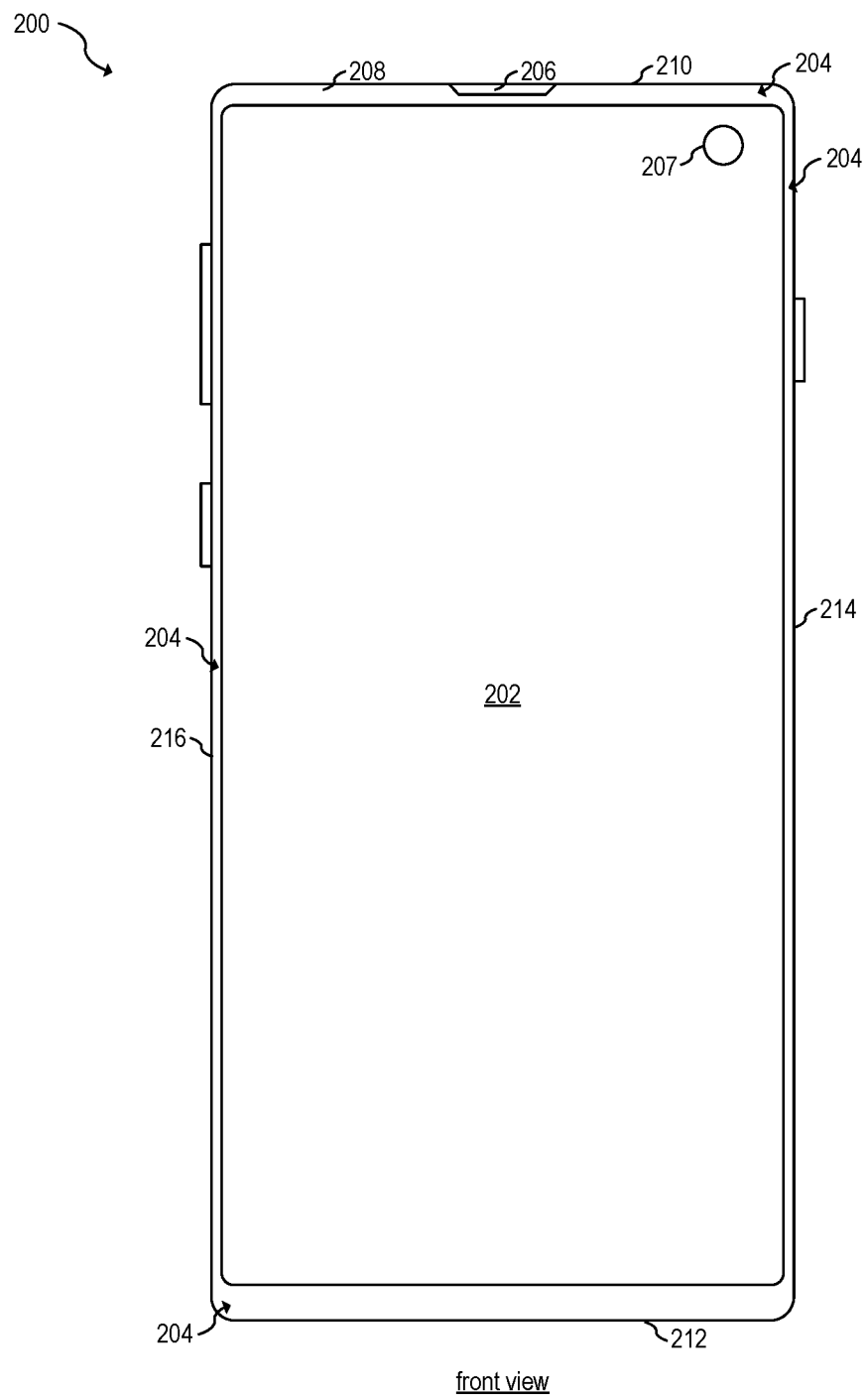
FIG. 2 shows an example of a smartphone with bezel-less design.
Figure 3:
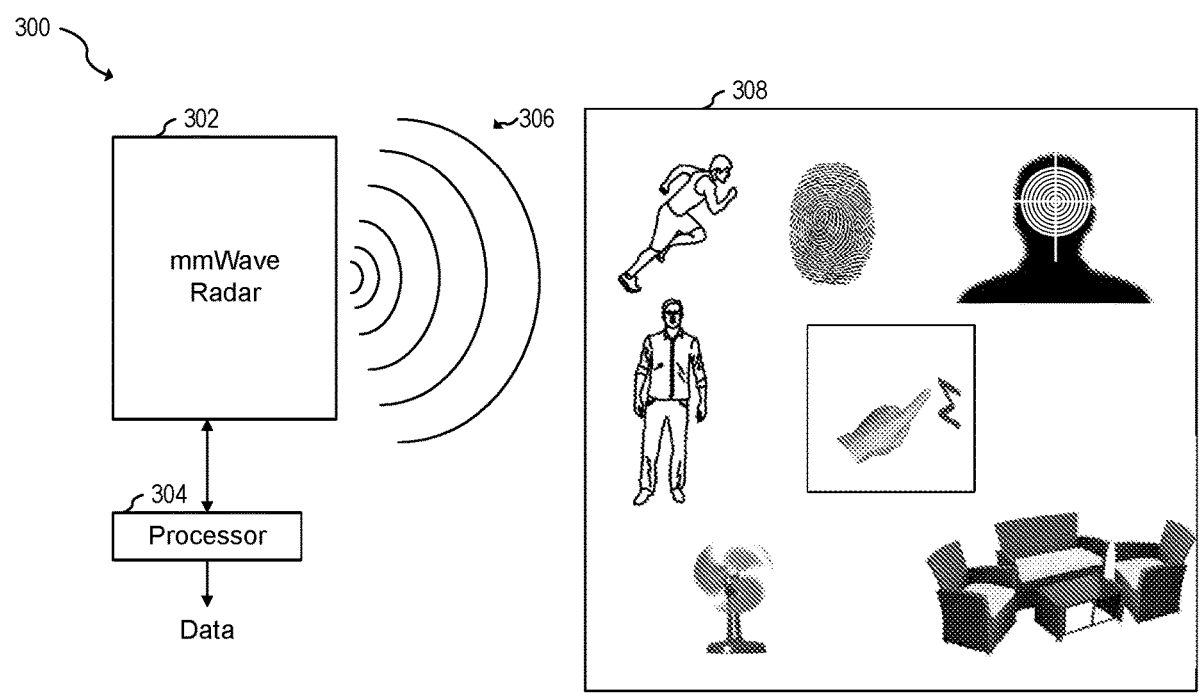
FIG. 3 shows a radar system, according to an embodiment of the present invention.

A radar, such as a millimeter-wave radar, may be used to detect and track targets, such as humans, a face, a finger, etc. The tracking of targets may allow, e.g., for gesture recognition. For example, FIG. 3 shows radar system 300, according to an embodiment of the present invention. Radar system 300 includes millimeter-wave radar 302 and processor 304. In some embodiments, millimeter-wave radar 302 includes processor 304.

During normal operation, millimeter-wave radar 302 transmits a plurality of radiation pulses 306, such as chirps, towards scene 308. In some embodiments the chirps are linear chirps (i.e., the instantaneous frequency of the chirp varies linearly with time).

The transmitted radiation pulses 306 are reflected by objects in scene 308. The reflected radiation pulses (not shown in FIG. 3), which are also referred to as the echo signal, are detected by millimeter-wave radar 302 and processed by processor 304 to, for example, detect and track targets.

The objects in scene 308 may include static and/or moving objects, including periodically moving objects, such as humans, a face, a finger, a fan, such as lying human no, a fan, furniture, a wall, etc.

Processor 304 analyses the echo data to determine the location of targets using signal processing techniques. For example, in some embodiments, a range FFT is used for estimating the range component of the location of a detected target (e.g., with respect to the location of the millimeter-wave radar). The azimuth component of the location of the detected target may be determined using angle estimation techniques.

Processor 304 may be implemented as a general purpose processor, controller or digital signal processor (DSP) that includes, for example, combinatorial circuits coupled to a memory. In some embodiments, the processor 304 may be implemented with an ARM architecture, for example. In some embodiments, processor 304 may be implemented as a custom application specific integrated circuit (ASIC). In some embodiments, processor 304 includes a plurality of processors, each having one or more processing cores. In other embodiments, processor 304 includes a single processor having one or more processing cores. Other implementations are also possible. Some embodiments may be implemented as a combination of hardware accelerator and software running on a DSP or general purpose microcontroller.

In some embodiments, millimeter-wave radar 302 operates as a FMCW radar that includes, a millimeter-wave radar sensor circuit, a transmitting antenna, and at least two receiving antennas. In some embodiments, a single receiving antenna may be used.

Millimeter-wave radar 302 transmits and receives signals in the 20 GHz to 122 GHz range. Alternatively, frequencies outside of this range, such as frequencies between 1 GHz and 20 GHz, or frequencies between 122 GHz, and 300 GHz, may also be used.

In some embodiments, the echo signals received by the receiving antennas of millimeter-wave radar 302 are filtered and amplified using band-pass filter (BPFs), low-pass filter (LPFs), mixers, low-noise amplifier (LNAs), and intermediate frequency (IF) amplifiers in ways known in the art. The echo signals are then digitized using one or more analog-to-digital converters (ADCs) for further processing. Other implementations are also possible.

Figure 4:
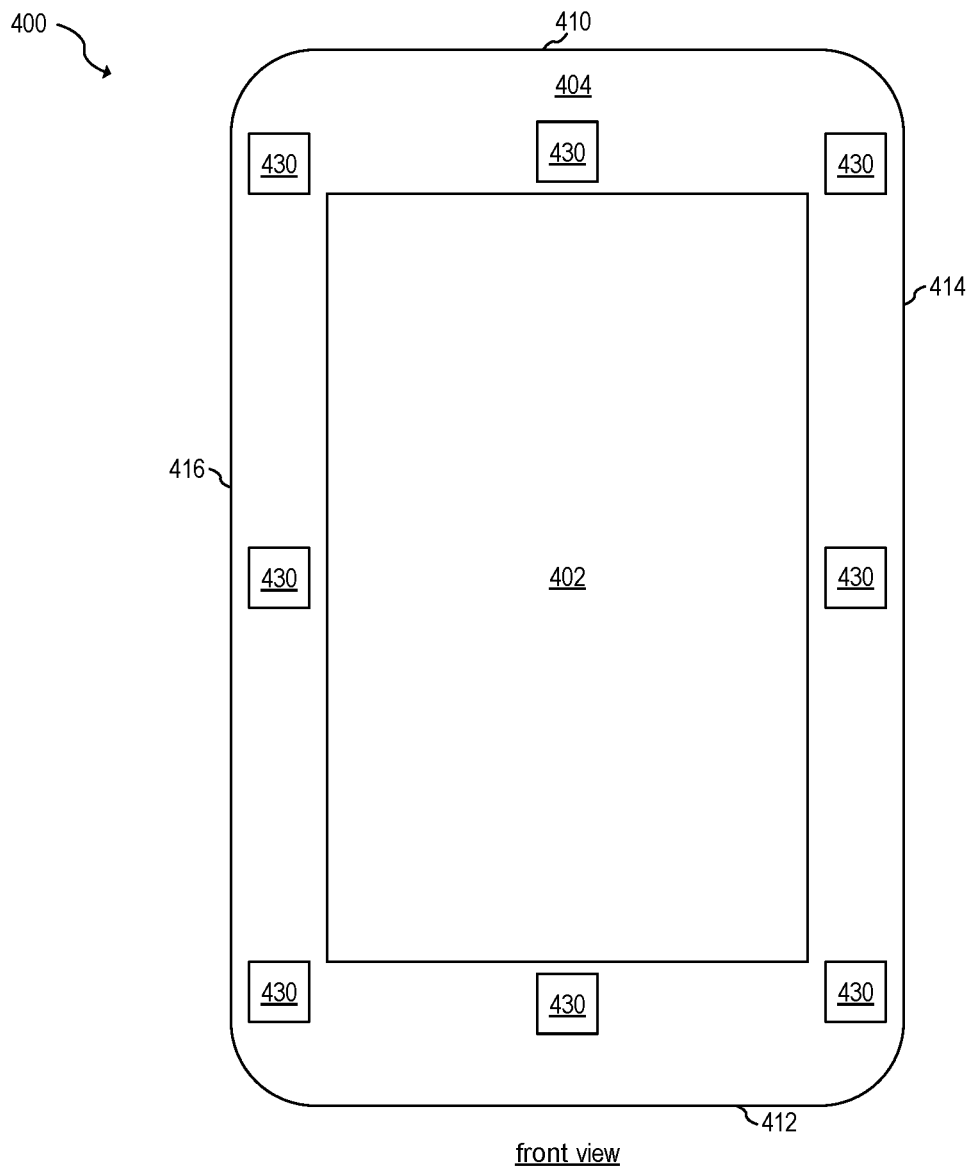
FIG. 4 shows a smartphone without a bezel-less design and including eight millimeter-wave radars.

One or more millimeter-wave radars 300 may be used in a mobile device, such as a smartphone, to implement features such as gesture recognition, face recognition, or other radar features, such as object detection and tracking. For example, FIG. 4 shows smartphone 400 without a bezel-less design and including eight millimeter-wave radars 430.

Figure 5:
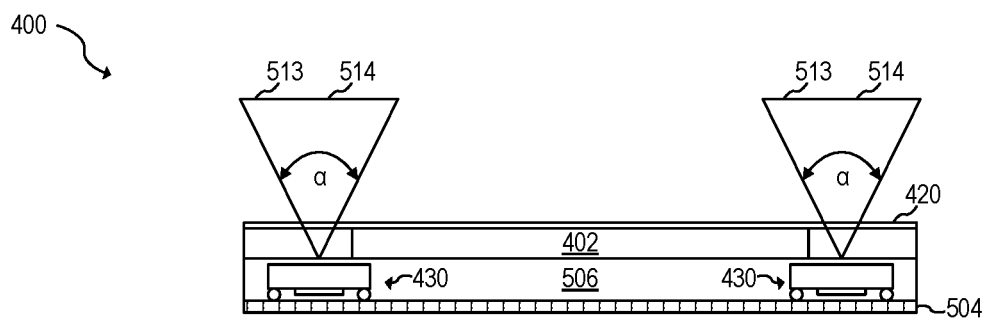
FIG. 5 shows a cross-section view of the smartphone FIG. 4.

FIG. 5 shows a cross-section view of smartphone 400. As shown in FIG. 5, smartphone 400 includes touchscreen 402, glass 420, and millimeter-wave radars 430. Touchscreen 402 is disposed over molding compound or gap 506 (where gap 506 may be a space void of molding compound, such as filled with air, such as an air gap). Millimeter-wave radars 430 are disposed on support structure 504 (which may be, e.g., a PCB, flexible PCB, or a molder plastic with metallization). Each millimeter-wave radar 430 has a respective field-of-view (FoV) 513 and is capable of producing a radar beam 514. Although FoV 513 and radar beam 514 are shown to be the same in FIG. 5, it is understood that a radar beam may be different (narrower) than the corresponding FoV.

The radar beam 514 may travel through glass with little or no attenuation or distortion. However, screen 402 may block partially or completely radar beam 514. Therefore, in some embodiments, and as shown in FIG. 5, the radar beam 514 of millimeter-wave radar 430 is projected through glass 42o but not through screen 402.

Figure 6:
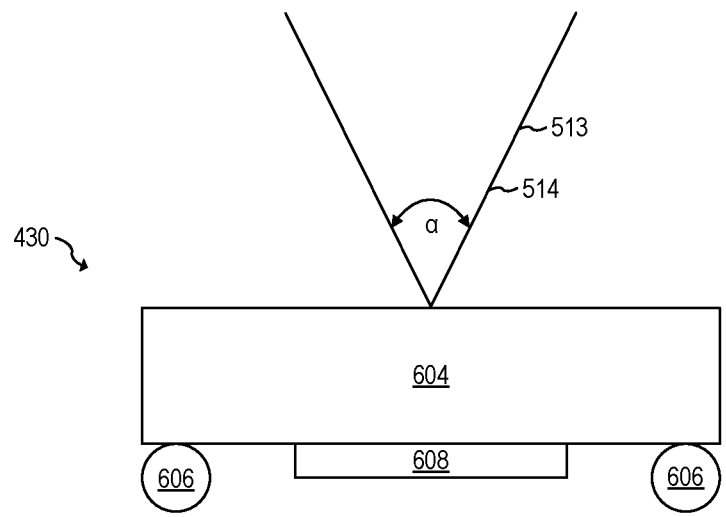
FIG. 6 shows a cross-section view of the millimeter-wave radar of FIGS. 4 and 5.

FIG. 6 shows a cross-section view of millimeter-wave radar 430. Millimeter-wave radar 430 includes die 608, balls 606, high frequency laminate 604 and one or more transmitting patch antennas (not shown) and one or more receiving patch antennas (not shown).

The dimensions of millimeter-wave radar 430, may be, for example, 3.5 mm of width, 2.5 mm of length and 1 mm of height.

As shown in FIGS. 4-6, smartphone 400 devotes at least about 2.5 mm of bezel to allow for the projection of radar beam 514.

In an embodiment, a smartphone incorporates one or more millimeter-wave radars adjacent to a frame of the smartphone. Each millimeter-wave radar is inside a respective package that also includes a Yagi antenna configured to radiate radar signals through a glass of the smartphone, and a patch antenna configured to radiate radar signals through a frame of the smartphone. The FoV of the plurality of millimeter-wave radars may cover 180°, 360° or may have spherical coverage. In some embodiments, the plurality of radars of the smartphone may perform target detection and/or tracking of targets in an advantageously broad FoV.

In an embodiment, the screen is separated from the frame of the smartphone by a distance that is lower than a height of the package in a location where a package including the millimeter-wave radar is located. For example, in an embodiment where the package has a height of 0.5 mm, the distance between the screen and the frame is lower than 0.5 mm at the location where the package is disposed.

Figure 7A:
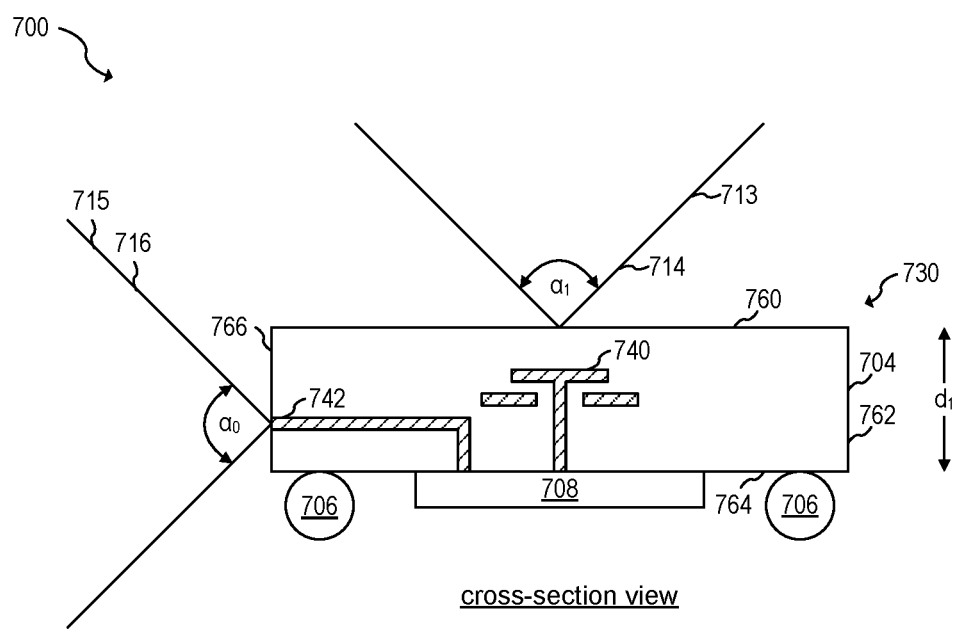
FIGS. 7A-7C show various views of a millimeter-wave radar, according to an embodiment of the present invention.
Figure 7B:
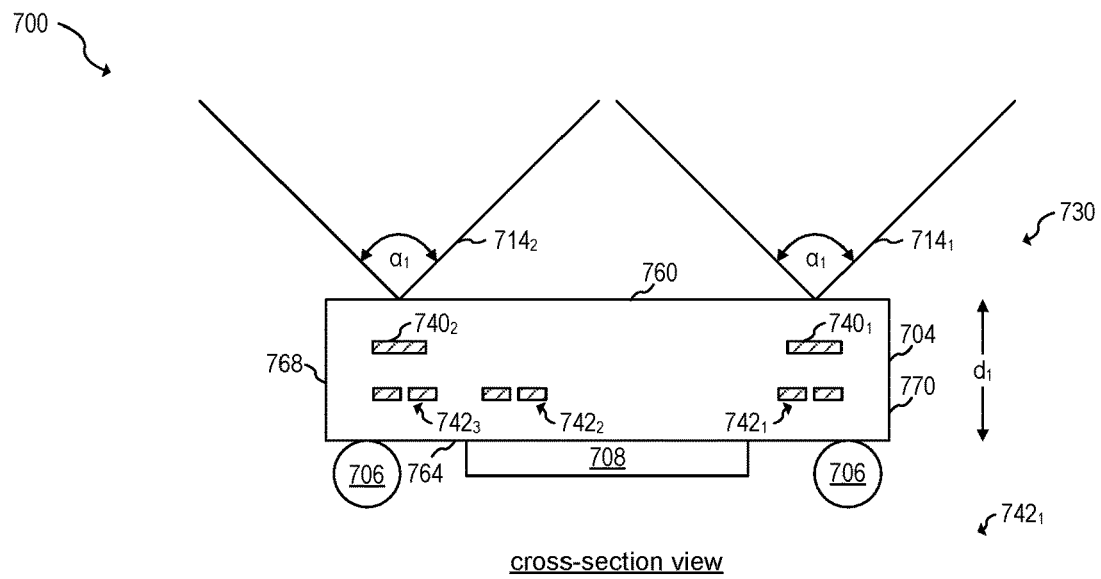
Figure 7C:
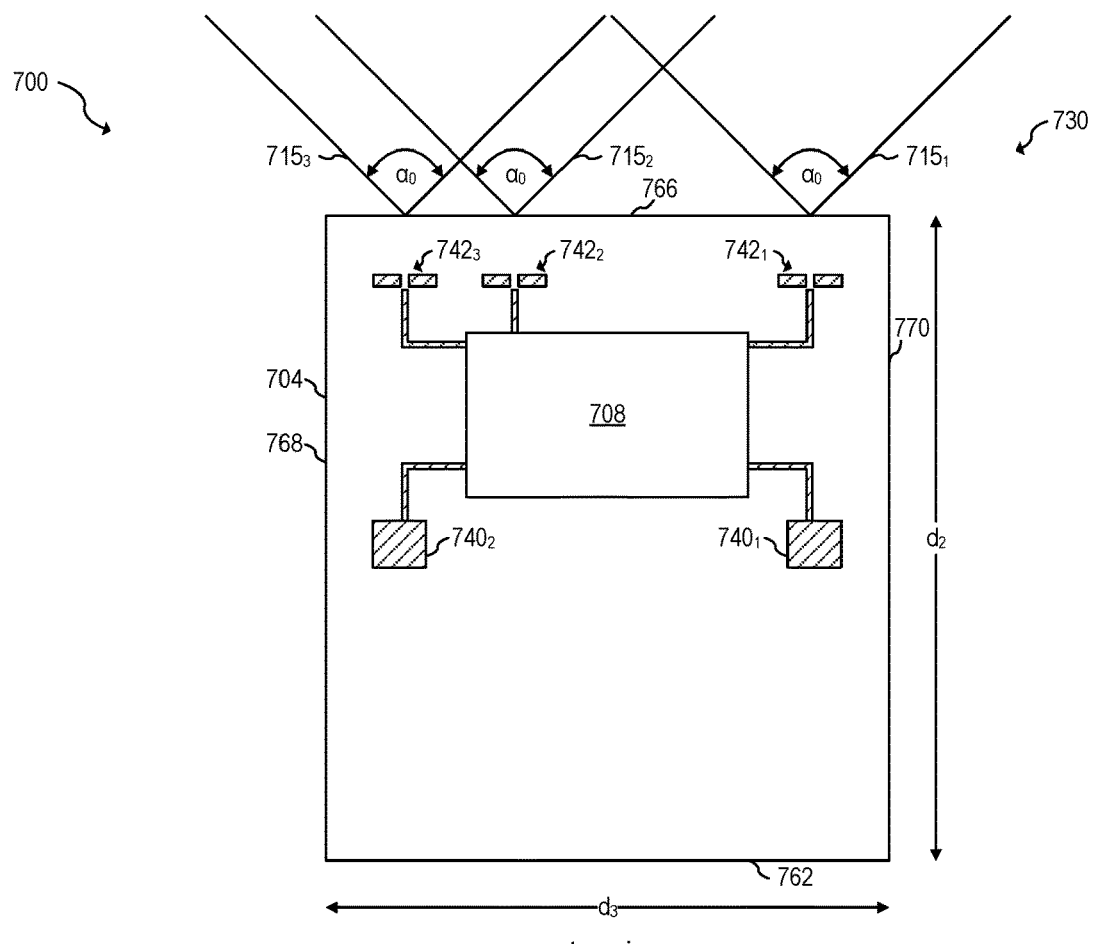

FIGS. 7A-7C show various views of millimeter-wave radar 700, according to an embodiment of the present invention. Millimeter-wave radar 700 may be implemented as millimeter-wave radar 302.

Millimeter-wave radar 700 includes package 730. Package 730 includes surfaces 760, 762, 764, 766, 768, and 770, die 708, balls 706, high frequency laminate 704, one or more antennas 740 for boresight radiation (e.g., patch antennas) and one or more antennas 742 for end-fire radiation (e.g., Yagi antennas).

As shown in FIGS. 7A-7C, high frequency laminate 704 includes a plurality of interconnect levels. In some embodiments, high frequency laminate 704 includes 5 interconnect levels. In some embodiments, high frequency laminate 704 may include more than 5 interconnect levels, such as 6 interconnect levels, or more. In other embodiments, high frequency laminate 704 may include less than 5 interconnect levels, such as 4 interconnect levels, or less.

In some embodiments, as shown in FIGS. 7A and 7B, the end-fire antennas and the patch antennas are disposed in different interconnect levels. In some embodiments, disposing the end-fire antennas and the patch antennas in different interconnect levels advantageously allows for a compact radar solution that radiates in multiple directions.

As shown in FIGS. 7B and 7C, millimeter-wave radar 700 may include one transmitting antenna ($740_1$ and $742_1$) and one or more receiving antennas ($740_2$, and $742_2$ and $742_3$) per radiation direction.

In some embodiments, radar beams 714 and 715 have a conical shape with an angle $\alpha_0$ and $\alpha_1$ between 45° and 55°. In some embodiments, angles $\alpha_0$ and $\alpha_1$ may be higher than 55°, such as 60°, 90°, or more. In other embodiments, angles $\alpha_0$ and $\alpha_1$ may be lower than 45° such as 40° or lower. In some embodiments, angles $\alpha_0$ and $\alpha_1$ may be the same. In other embodiments, angles $\alpha_0$ and $\alpha_1$ may be different.

High frequency laminate 704 may be, for example, RO 4350 laminate from Rogers Corporation, Megtron 6 or 7 laminates from Panasonic, HL972 or HL 872 laminates from Mitsubishi. Other high-speed laminates may also be used.

Balls 706 are used to connect die 708 with external circuits. Some embodiments may implement pads instead of balls. Other types of connectors may also be used.

Die 708 is a radio-frequency (RF) integrated circuit (IC) (RFIC) that includes a millimeter-wave radar sensor circuit (not shown). The millimeter-wave radar sensor circuit may transmit and receive signals in the GHz range via antennas 740 and 742. For example, some embodiments may transmit and receive signals such as chirps in a band allocated around frequencies such as 95 GHz, 120 GHz, 140 GHz, and/or 240 GHz and/or other frequencies between about 95 GHz and about 240 GHz range. In some embodiments, operating millimeter-wave radar at frequencies of 90 GHz or higher (such as 120 GHz), advantageously allows for a smaller size of the package 730, when compared with lower frequencies.

Some embodiments may transmit and receive signals such as chirps in the 20 GHz to 122 GHz range. Some embodiments may transmit and receive signals, such as chirps with frequencies above 240 GHz. Other frequencies and frequency ranges are also possible.

By running at high frequencies, such as millimeter-wave frequencies, and by having the antennas integrated in the same package, the package and antenna size of millimeter-wave radar 700 may be reduced to allow a plurality of millimeter-wave radars 700 to be placed in the perimeter of a touchscreen, such as the touchscreen of a smartphone or wearable device. In some embodiments, for example, dimensions $d_1$, $d_2$, and $d_3$ may be, for example, 0.5 mm, 2.25 mm, and 3.5 mm, respectively. Other dimensions are also possible.

In some embodiments, the millimeter-wave radar sensor circuit process the echo signals received by using band-pass filter (BPFs), low-pass filter (LPFs), mixers, low-noise amplifiers (LNAs), and intermediate frequency (IF) amplifiers in ways known in the art. The echo signals are then digitized using one or more analog-to-digital converters (ADCs) for further processing. Other implementations are also possible.

Figure 8:
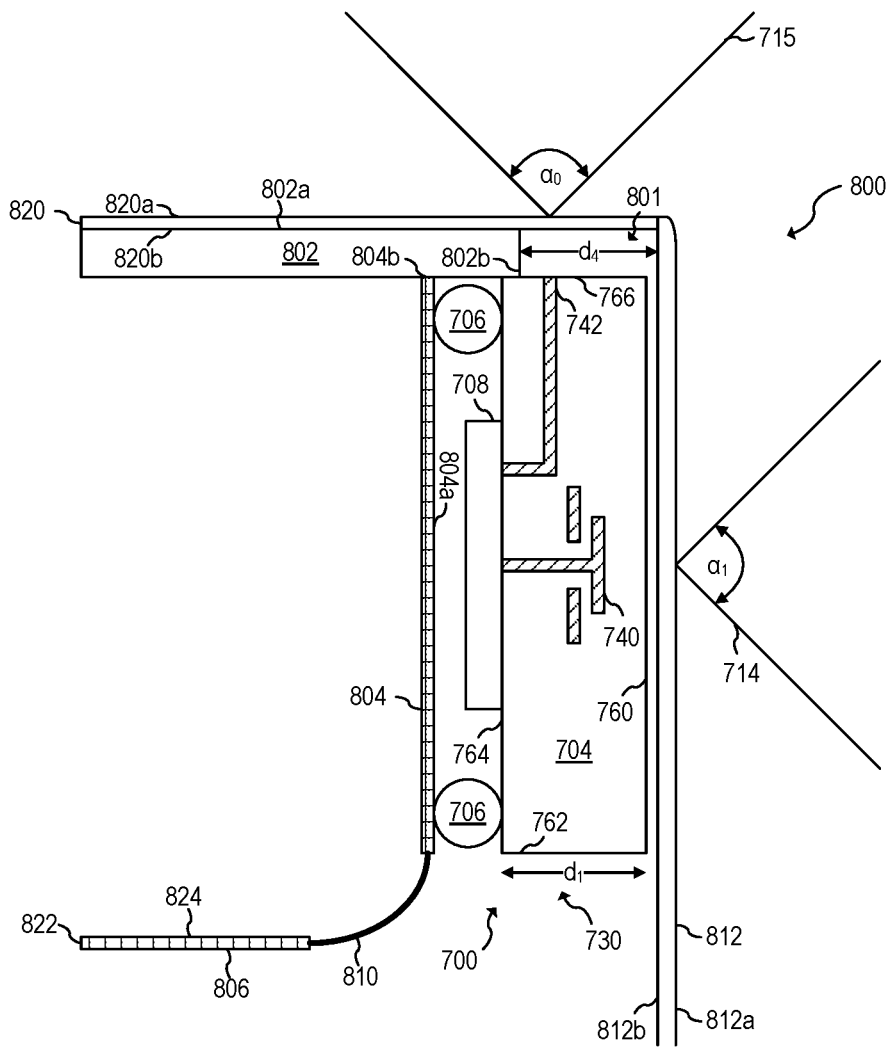
FIG. 8 shows a cross-section view of a portion of a smartphone having a bezel-less design and including at least one millimeter-wave radar, according to an embodiment of the present invention.

FIG. 8 shows a cross-section view of a portion of smartphone 800 having a bezel-less design and including at least one millimeter-wave radar 700, according to an embodiment of the present invention. Smartphone 800 includes screen 802, glass 82o, millimeter-wave radar 700, PCBs 804 and 806, flex PCB 810, and frame 812.

As shown in FIG. 8, millimeter-wave radar 700 is coupled to PCB 804, e.g. via balls 706. As shown, PCB 804 has a main surface 804a that is perpendicular to main surface 802a of screen 802. Surface 766, which is the edge surface of package 730 that is closer to antenna(s) 742 faces surface 820b of glass 82o. Surface 76o, which is the main surface of package 730 that is closer to antenna(s) 740 faces surface 812b of frame 812, which for instance forms an edge face of the smartphone. In some embodiments, placing millimeter-wave radar 700 in this manner (with edge surface 760 facing surface 812b of frame 812 and perpendicular to surface 820b of glass 820) advantageously allows for broad FoV of millimeter-wave radar 700, which includes the FoV 713 and 716 and covers, in some embodiments, up to 180° ($\alpha_0 + \alpha_1$).

In some embodiments, such as shown in FIG. 8, screen 802 is in contact with edge surface 804b of PCB 804. In other embodiments, screen 802 may not be in contact with PCB 804.

In some embodiments, such as shown in FIG. 8, distance $d_4$ between edge surface 802b of screen 802 and surface 812b of frame 812 is smaller than height $d_1$ of high frequency laminate 704. As shown in FIG. 8, a region (gap 801) adjacent to edge surface 766 is void of screen 802 and screen 802, therefore, may partially cover portions of high frequency laminate 704 without covering antenna(s) 742, thereby, without interfering or substantially interfering with radar beam 715. In some embodiments, partially covering portions of high frequency laminate 704 advantageously allows for an increase in display size while preserving the ability to perform radar functions, e.g., with millimeter-wave radar 700.

In some embodiments, gap 801 is filled with air. In other embodiments, gap 801 includes other materials in addition to or instead of air, such as plastic or glass, for example.

In some embodiments, distance $d_4$ may be between 0.3 mm and 0.5 mm. In other embodiments, distance $d_4$ may be higher than 0.5 mm, such as 1 mm or higher, or smaller than 0.3 mm, such as 0.28 mm or less. For example, a smaller distance $d_4$ may be possible if antenna(s) 742 are formed in an interconnect level closer to surface 760 (such as, e.g., in interconnect levels 4, 5, or 6).

Glass 820 does not interfere, or does not substantially interfere with millimeter-wave radiation. In other words, millimeter-wave radiation can freely travel through glass 820, e.g., without (e.g., substantial) attenuation/distortion. Examples of glass 820 include tempered glass, Dragontrail glass and Corning® Gorilla® glass, such as such as Gorilla® glass 4, Gorilla®) glass 5, and Gorilla® glass 6. Other types of glass may also be used.

Frame 812 may include materials such as plastic, and other materials that do not interfere or do not substantially interfere with millimeter-wave radiation. Frame 812 is located at the perimeter of smartphone 800 and may correspond to any of the sides of the smartphone 800. For example, if smartphone 800 has a design similar to smartphone 200, frame 812 may correspond to any of frames 210, 212, 214, or 216.

Screen 802 may be, for example, a display with touchscreen capabilities (also known as a touchscreen). In some embodiments, screen 802 may be a display without touchscreen capabilities.

As shown, PCBs 804 is directly connected to millimeter-wave radar 700, e.g., via balls 706. PCB 804 is coupled to main PCB 806, e.g., via flex PCB 810, where PCB 806 includes, e.g., a processor (not shown) and/or other circuits of smartphone 800. PCBs 804, 806, and flex PCB 810 may be implemented in any way known in the art. For example, in some embodiments, PCBs 804, 806 and 810 may include materials such as FR-4. Other implementations, such as using laminate, metallized plastic, or flex PCB, may also be used.

Figure 9A:
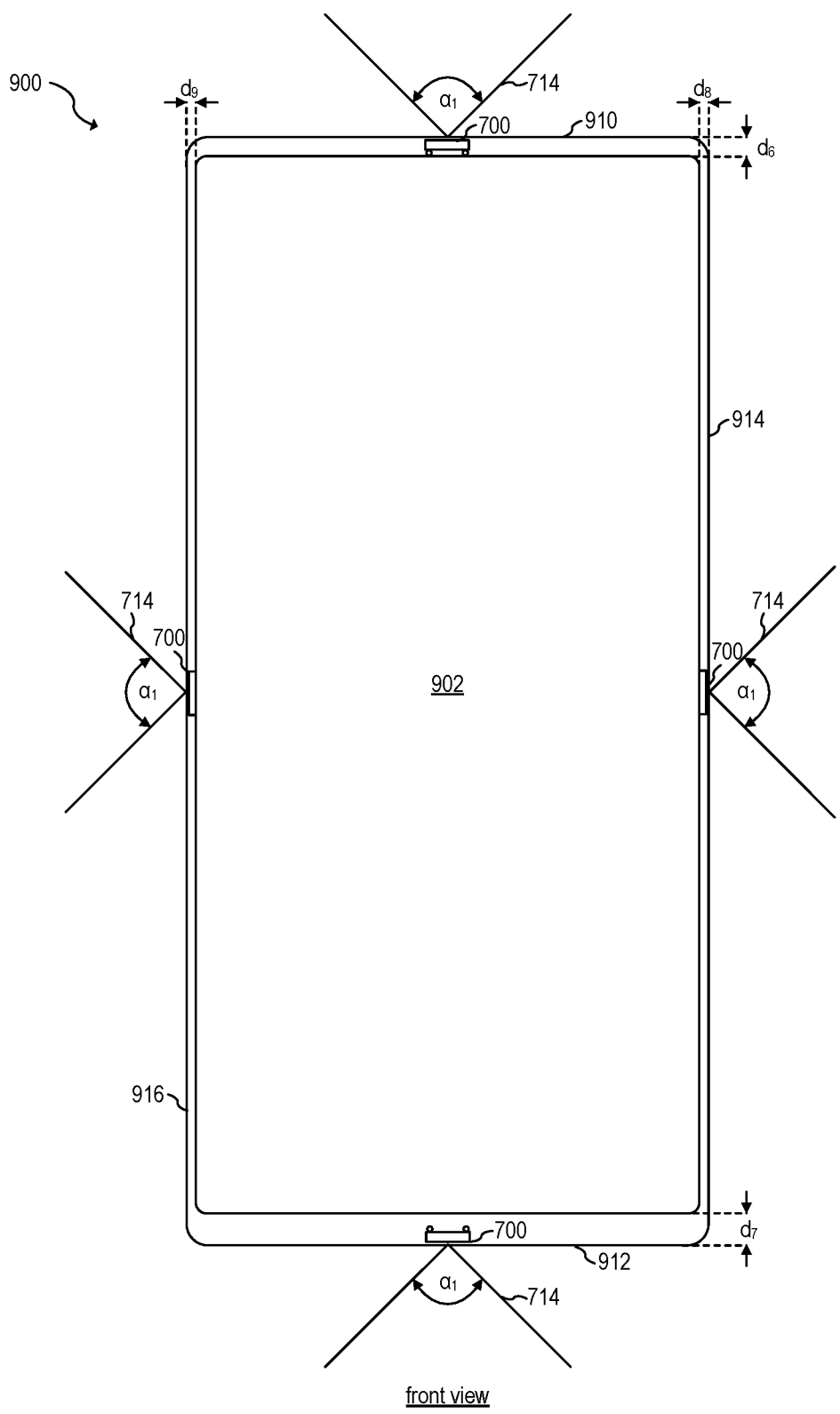

FIGS. 9A-9C show various views of smartphone 900 having a bezel-less design and including four millimeter-wave radars 700, according to an embodiment of the present invention. Screen 902 may be implemented in a similar manner as screen 802.

As shown in FIG. 9A, the high frequency laminate 704 of millimeter-wave radars 700 near surfaces 914 and 916 are partially covered by screen 902 (e.g., as shown in FIG. 8), which no portion of millimeter-wave radars 700 near surfaces 910 and 912 are covered by screen 902. In some embodiments, it is possible to extend screen 902 to cover portions of millimeter-wave radars 700 near surfaces 910 and/or 912. In other words, as shown in FIGS. 9B and 9C, any or all of distances $d_6$, $d_7$, $d_8$, and $d_9$ may be smaller than distance $d_1$. In some embodiments, distances $d_6$, $d_7$, $d_8$, and $d_9$ may all be equal to each other. In other embodiments, distances $d_6$, $d_7$, $d_8$, and $d_9$ may all be different from each other. Other implementations are also possible.

As shown in FIG. 9A, in some embodiments, the four millimeter-wave radars 700 allows for a FoV covering 360° around frames 910, 912, 914, and 916. As shown in FIGS. 9B and 9C, in some embodiments, the four millimeter-wave radars 700 allows for a FoV covering 180° covering screen 920.

Figure 10A:
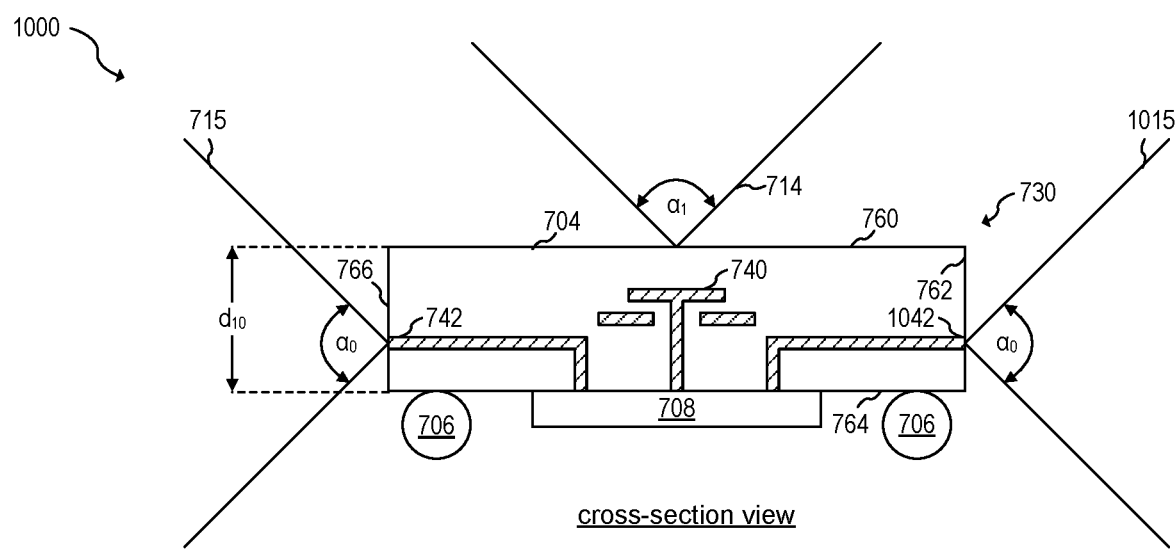
FIGS. 10A and 10B show various views of a millimeter-wave radar, according to an embodiment of the present invention.
Figure 10B:
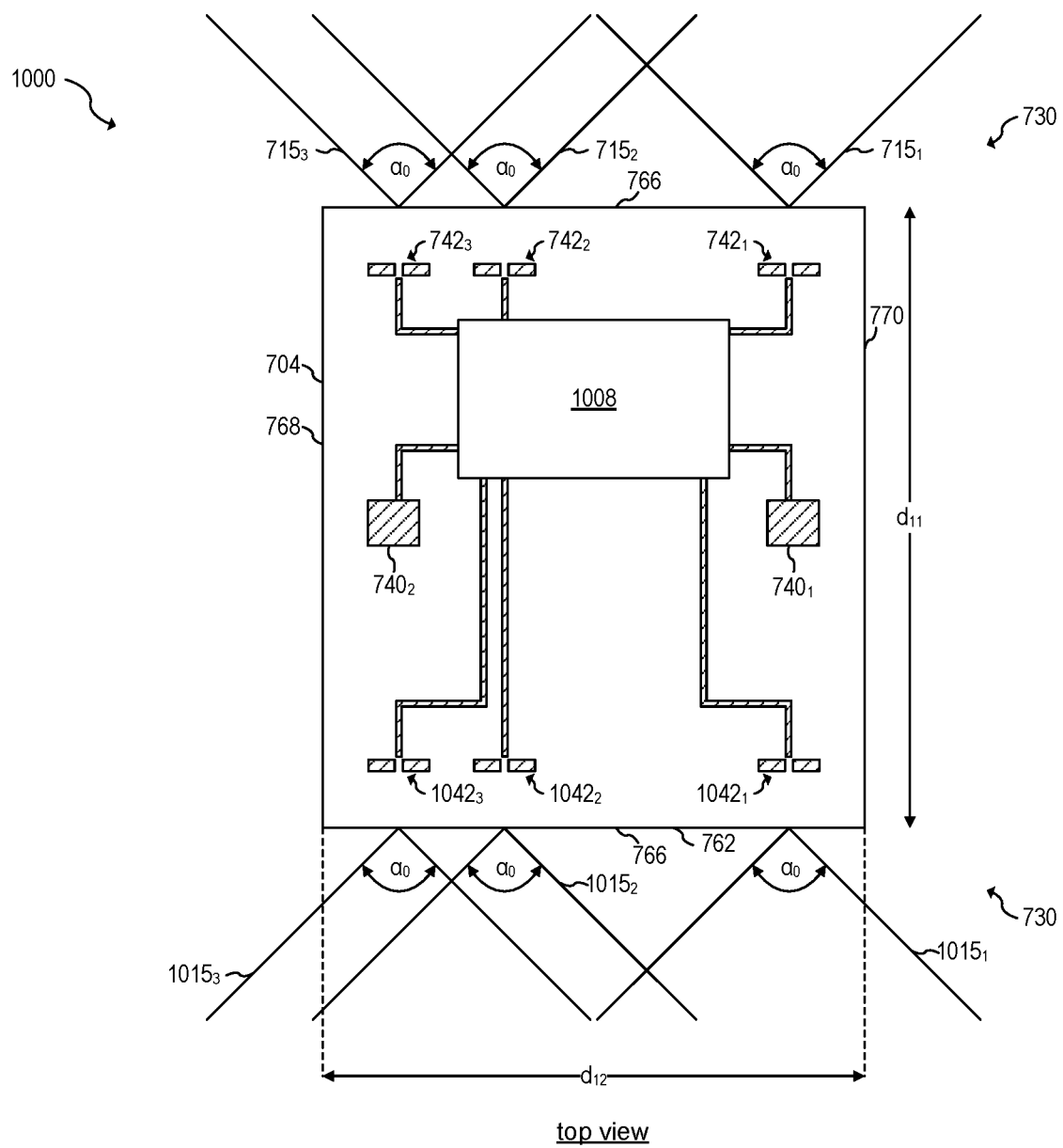

FIGS. 10A and 10B show various views of millimeter-wave radar moo, according to an embodiment of the present invention. Millimeter-wave radar 1000 is implemented and operates in a similar manner as millimeter-wave radar 700. Millimeter-wave radar 1000 however, includes one or more end-fire antennas facing surface 764, e.g., as shown in FIGS. 10A and 10B. For example, as shown in FIGS. 10A and 10B, antenna $1042_1$ is a transmitting antenna, and antennas 10422 and 10423 are receiving antennas.

As shown in FIG. 10A, radar beam 1015 has a direction that is opposite to radar beam 715.

Distances $d_{10}$, $d_{11}$, and $d_{12}$ may be the same as distances $d_1$, $d_2$, and $d_3$. In some embodiments, distances $d_{10}$, $d_{11}$, and $d_{12}$ may be different as distances $d_1$, $d_2$, and $d_3$.

As shown in FIG. 10A, antennas 742 and 1042 may be implemented in the same interconnect level. In some embodiments, antennas 742 and 1042 may be implemented in different interconnect levels. In some embodiments, antenna 740 may be omitted.

Figure 11:
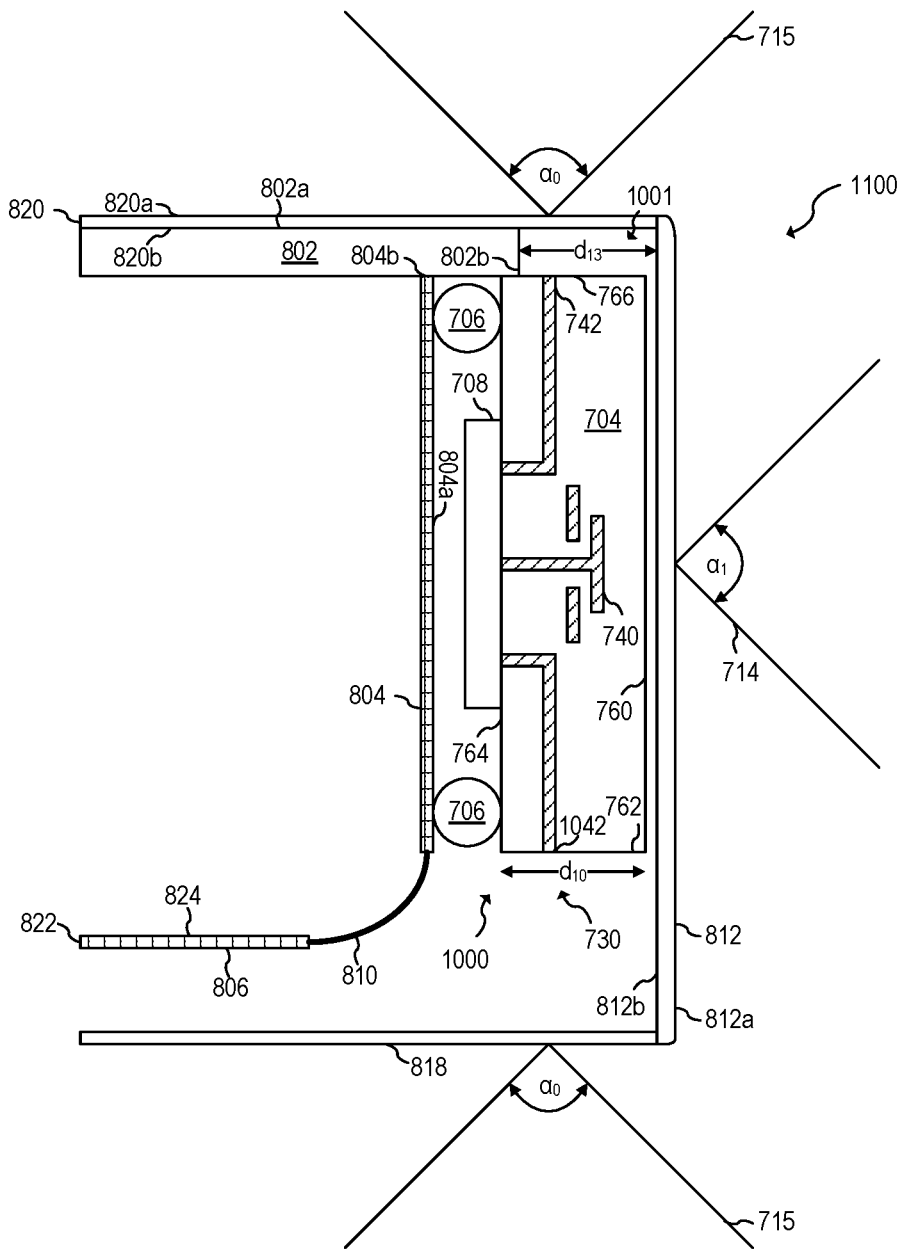
FIG. 11 shows a cross-section view of a portion of s smartphone having a bezel-less design and including at least one millimeter-wave radar, according to an embodiment of the present invention.

FIG. 11 shows a cross-section view of a portion of smartphone 1100 having a bezel-less design and including at least one millimeter-wave radar 1000, according to an embodiment of the present invention. Smartphone 1100 is implemented and operates in a similar manner as smartphone 800. Smartphone 1100 however, includes antenna(s) 1042 radiating towards the back frame 818 of smartphone 1100.

Figure 12A:
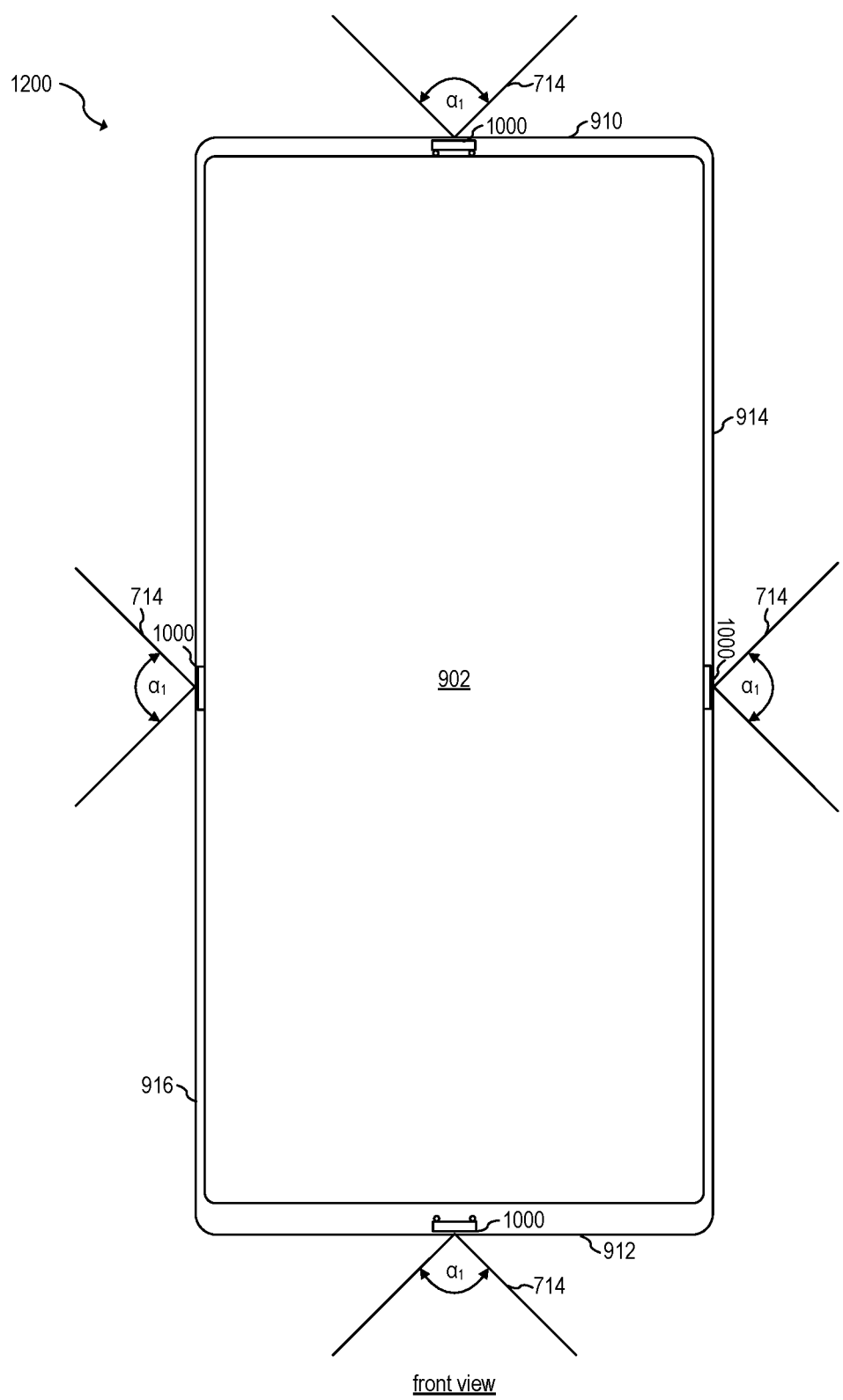
FIGS. 12A-12C show various views of a smartphone having a bezel-less design and including four millimeter-wave radars, according to an embodiment of the present invention.
Figure 12B:
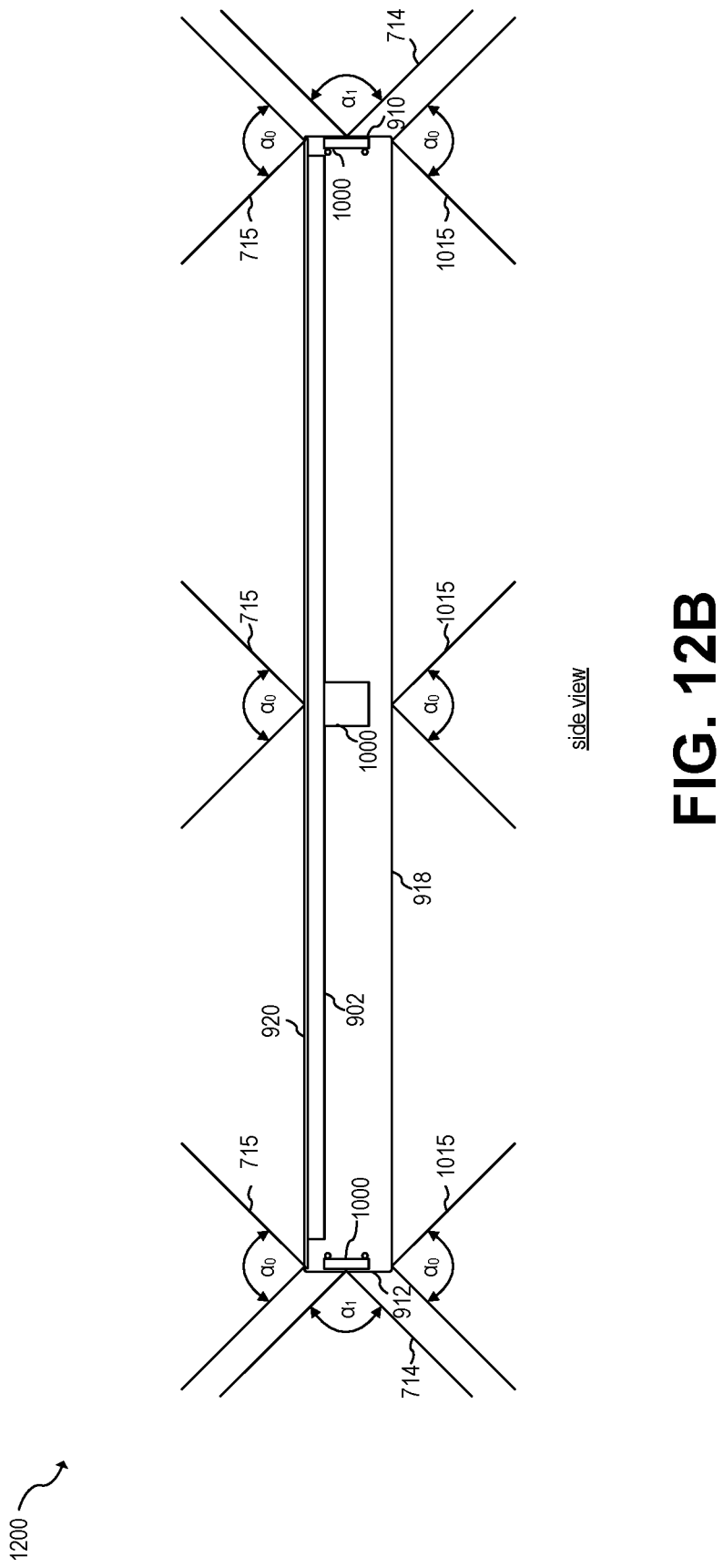
Figure 12C:
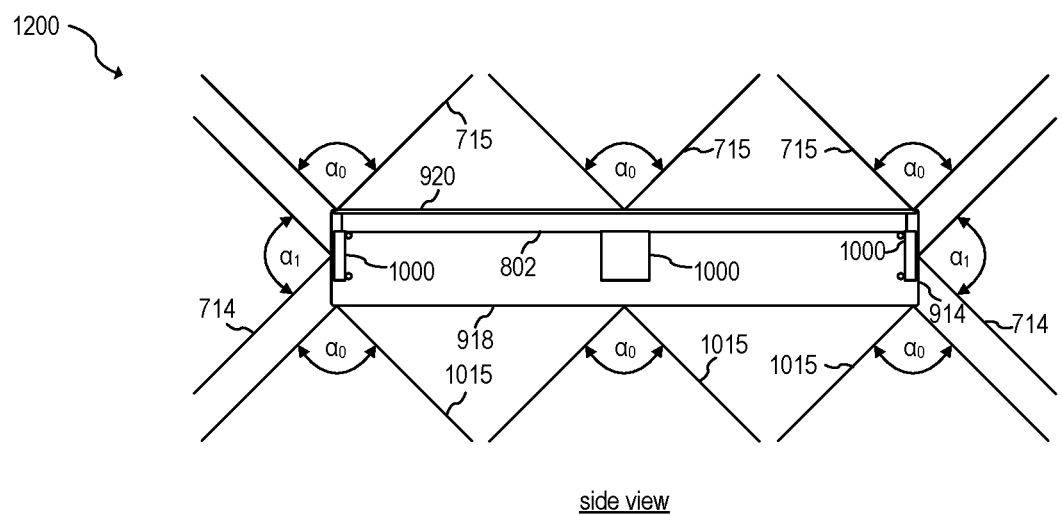

FIGS. 12A-12C show various views of smartphone 1200 having a bezel-less design and including four millimeter-wave radars woo, according to an embodiment of the present invention. Smartphone 1200 is implemented and operates in a similar manner as smartphone 900. Smartphone 1200 however, includes antenna(s) 1042 radiating towards the back frame 918 of smartphone 1200.

In some embodiments, e.g., as shown in FIGS. 12A-12C, implementing millimeter-wave radar 1000, e.g., as shown in FIG. 11, advantageously allows for having a spherical FoV around the smartphone.

Example embodiments of the present invention are summarized here. Other embodiments can also be understood from the entirety of the specification and the claims filed herein.

Example 1. A device including: a first support structure having a main surface and an edge surface; a screen covering the first support structure and having a main surface and an edge surface; a glass covering the screen; a frame; and a package electrically coupled to the first support structure via a connector, the package including a radio-frequency integrated circuit (RFIC) and a laminate that has a plurality of interconnect levels, the plurality of interconnect levels including an end-fire antenna configured to direct a first millimeter-wave radiation beam through the glass, and a patch antenna configured to direct a second millimeter-wave radiation beam through the frame, where the screen partially covers the laminate.

Example 2. The device of example 1, further including a second support structure having a main surface substantially parallel to the main surface of the screen, the main surface of the second support structure being substantially perpendicular to the main surface of the first support structure, where the first support structure is electrically coupled to the second support structure.

Example 3. The device of one of examples 1 or 2, where the first support structure includes a first printed circuit board (PCB) and where the second support structure includes a second PCB, and where the first PCB is electrically coupled to the second PCB via a flex PCB.

Example 4. The device of one of examples 1 to 3, where the glass extends beyond the edge surface of the screen and is in contact with the frame.

Example 5. The device of one of examples 1 to 4, where the screen is in contact with the edge surface of the first support structure.

Example 6. The device of one of examples 1 to 5, where the screen is in contact with the laminate.

Example 7. The device of one of examples 1 to 6, where the end-fire antenna is a Yagi antenna.

Example 8. The device of one of examples 1 to 7, where the plurality of interconnect levels includes between 4 and 6 interconnect levels.

Example 9. The device of one of examples 1 to 8, where a first interconnect level of the plurality of interconnect levels includes the end-fire antenna, and where a second interconnect level of the plurality of interconnect levels includes the patch antenna.

Example 10. The device of one of examples 1 to 9, where the first interconnect level further includes a second end-fire antenna configured to direct a third millimeter-wave radiation beam in a direction opposite to a direction of the first millimeter-wave radiation beam.

Example 11. The device of one of examples 1 to 10, where the first interconnect level is closer to the RFIC than the second interconnect level.

Example 12. The device of one of examples 1 to 11, where the end-fire antenna is a transmitting antenna, the package further including first and second receiving end-fire antennas disposed in the first interconnect level.

Example 13. The device of one of examples 1 to 12, where the RFIC includes a millimeter-wave radar configured to transmit a radiation pulse using the end-fire antenna, and configured to receive a reflected radiation pulse using the first and second receiving end-fire antennas.

Example 14. The device of one of examples 1 to 13, where the radiation pulse includes a chirp.

Example 15. The device of one of examples 1 to 14, where a distance between the edge surface of the screen and the frame is between 0.3 mm and 0.5 mm.

Example 16. The device of one of examples 1 to 15, where the glass has a thickness lower than 1.3 mm, has a shear modulus higher than 26 GPa, and has a fracture toughness higher than 0.67 MPa m0.5.

Example 17. The device of one of examples 1 to 16, where the first and second millimeter-wave radiation beams include signals between 24 GHz, and 120 GHz.

Example 18. The device of one of examples 1 to 17, where the package has a first thickness, and where a distance between the edge surface of the screen and the frame is lower than the first thickness.

Example 19. A mobile device including: a screen; a glass; first, second, third and fourth frames that surround the screen and the glass; a gap between the screen and the first frame; a first printed circuit board (PCB) having a main surface facing the first frame and an edge surface facing the screen; and a package electrically coupled to the first PCB via a connector, the package including a radio-frequency integrated circuit (RFIC) that includes a millimeter-wave radar and a laminate having a plurality of interconnect levels, where a first interconnect level of the plurality of interconnect levels includes an end-fire antenna configured to direct a first millimeter-wave radiation beam through the gap and the glass, and where a second interconnect level of the plurality of interconnect levels includes a patch antenna configured to direct a second millimeter-wave radiation beam through the first frame, where the package has a first thickness, and where a distance between the screen and the first frame is lower than the first thickness.

Example 20. The mobile device of example 19, further including: a second gap between the screen and the second frame; a second PCB having a main surface facing the second frame and an edge surface facing the screen; and a second package electrically coupled to the second PCB via a connector, the second package including a second radio-frequency integrated circuit (RFIC) that includes a second millimeter-wave radar and a second laminate having a second plurality of interconnect levels, where a first interconnect level of the second plurality of interconnect levels includes a second end-fire antenna configured to direct a third millimeter-wave radiation beam through the second gap and the glass, and where a second interconnect level of the second plurality of interconnect levels includes a patch antenna configured to direct a fourth millimeter-wave radiation beam through the second frame.

Example 21. The mobile device of one of examples 19 or 20, where the first frame is opposite the second frame.

Example 22. A method for transmitting and receiving radar signals in a mobile device, the method including: transmitting a first radar signal through a glass of the mobile device with a first Yagi antenna of a package, the first Yagi antenna being formed in a first interconnect level of a laminate of the package, where a screen of the mobile device covers the laminate and does not cover the first interconnect level; transmitting a second radar signal through a frame of the mobile device with a first patch antenna of the package, the first patch antenna being formed in a second interconnect level of the laminate, the first interconnect level being different from the second interconnect level; and receiving reflected radar signals with a second Yagi antenna formed in the first interconnect level and a second patch antenna formed in the second interconnect level.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device comprising:
  a first support structure having a main surface and an edge surface;
  a screen covering the first support structure and having a main surface and an edge surface;
  a glass covering the screen;
  a frame; and
  a package electrically coupled to the first support structure via a connector, the package comprising a radio-frequency integrated circuit (RFIC) and a laminate that has a plurality of interconnect levels, the plurality of interconnect levels comprising an end-fire antenna configured to direct a first millimeter-wave radiation beam through the glass, and a patch antenna configured to direct a second millimeter-wave radiation beam through the frame, wherein the screen partially covers the laminate.

2. The device of claim 1, further comprising a second support structure having a main surface substantially parallel to the main surface of the screen, the main surface of the second support structure being substantially perpendicular to the main surface of the first support structure, wherein the first support structure is electrically coupled to the second support structure.

3. The device of claim 2, wherein the first support structure comprises a first printed circuit board (PCB) and wherein the second support structure comprises a second PCB, and wherein the first PCB is electrically coupled to the second PCB via a flex PCB.

4. The device of claim 1, wherein the glass extends beyond the edge surface of the screen and is in contact with the frame.

5. The device of claim 1, wherein the screen is in contact with the edge surface of the first support structure.

6. The device of claim 1, wherein the screen is in contact with the laminate.

7. The device of claim 1, wherein the end-fire antenna is a Yagi antenna.

8. The device of claim 1, wherein the plurality of interconnect levels comprises between 4 and 6 interconnect levels.

9. The device of claim 1, wherein a first interconnect level of the plurality of interconnect levels comprises the end-fire antenna, and wherein a second interconnect level of the plurality of interconnect levels comprises the patch antenna.

10. The device of claim 9, wherein the first interconnect level further comprises a second end-fire antenna configured to direct a third millimeter-wave radiation beam in a direction opposite to a direction of the first millimeter-wave radiation beam.

11. The device of claim 9, wherein the first interconnect level is closer to the RFIC than the second interconnect level.

12. The device of claim 9, wherein the end-fire antenna is a transmitting antenna, the package further comprising first and second receiving end-fire antennas disposed in the first interconnect level.

13. The device of claim 12, wherein the RFIC comprises a millimeter-wave radar configured to transmit a radiation pulse using the end-fire antenna, and configured to receive a reflected radiation pulse using the first and second receiving end-fire antennas.

14. The device of claim 13, wherein the radiation pulse comprises a chirp.

15. The device of claim 1, wherein a distance between the edge surface of the screen and the frame is between 0.3 mm and 0.5 mm.

16. The device of claim 1, wherein the glass has a thickness lower than 1.3 mm, has a shear modulus higher than 26 GPa, and has a fracture toughness higher than 0.67 MPa m$^{0.5}$.

17. The device of claim 1, wherein the first and second millimeter-wave radiation beams comprise signals between 24 GHz, and 120 GHz.

18. The device of claim 1, wherein the package has a first thickness, and wherein a distance between the edge surface of the screen and the frame is lower than the first thickness.

19. A mobile device comprising:
  a screen;
  a glass;
  first, second, third and fourth frames that surround the screen and the glass;
  a gap between the screen and the first frame;
  a first printed circuit board (PCB) having a main surface facing the first frame and an edge surface facing the screen; and
  a package electrically coupled to the first PCB via a connector, the package comprising a radio-frequency integrated circuit (RFIC) that comprises a millimeter-wave radar and a laminate having a plurality of interconnect levels, wherein a first interconnect level of the plurality of interconnect levels comprises an end-fire antenna configured to direct a first millimeter-wave radiation beam through the gap and the glass, and wherein a second interconnect level of the plurality of interconnect levels comprises a patch antenna configured to direct a second millimeter-wave radiation beam through the first frame, wherein the package has a first thickness, and wherein a distance between the screen and the first frame is lower than the first thickness.

20. The mobile device of claim 19, further comprising:
  a second gap between the screen and the second frame;
  a second PCB having a main surface facing the second frame and an edge surface facing the screen; and
  a second package electrically coupled to the second PCB via a connector, the second package comprising a second radio-frequency integrated circuit (RFIC) that comprises a second millimeter-wave radar and a second laminate having a second plurality of interconnect levels, wherein a first interconnect level of the second plurality of interconnect levels comprises a second end-fire antenna configured to direct a third millimeter-wave radiation beam through the second gap and the glass, and wherein a second interconnect level of the second plurality of interconnect levels comprises a patch antenna configured to direct a fourth millimeter-wave radiation beam through the second frame.

21. The mobile device of claim 20, wherein the first frame is opposite the second frame.

22. A method for transmitting and receiving radar signals in a mobile device, the method comprising:
  transmitting a first radar signal through a glass of the mobile device with a first Yagi antenna of a package, the first Yagi antenna being formed in a first interconnect level of a laminate of the package, wherein a screen of the mobile device covers the laminate and does not cover the first interconnect level;

transmitting a second radar signal through a frame of the mobile device with a first patch antenna of the package, the first patch antenna being formed in a second interconnect level of the laminate, the first interconnect level being different from the second interconnect level; and receiving reflected radar signals with a second Yagi antenna formed in the first interconnect level and a second patch antenna formed in the second interconnect level.

* * * * *